US012632262B2

(12) United States Patent
Chirca et al.

(10) Patent No.: US 12,632,262 B2
(45) **Date of Patent: \*May 19, 2026**

(54) PROGRAMMABLE EVENT TESTING

(71) Applicant: TEXAS INSTRUMENTS INCORPORATED, Dallas, TX (US)

(72) Inventors: Kai Chirca, Dallas, TX (US); Timothy D. Anderson, University Park, TX (US)

(73) Assignee: TEXAS INSTRUMENTS INCORPORATED, Dallas, TX (US)

( \* ) Notice: Subject to any disclaimer, the term of this patent is extended or adjusted under 35 U.S.C. 154(b) by 255 days.

This patent is subject to a terminal disclaimer.

(21) Appl. No.: 17/956,970

(22) Filed: Sep. 30, 2022

(65) Prior Publication Data

US 2023/0022869 A1 Jan. 26, 2023

Related U.S. Application Data

(63) Continuation of application No. 17/079,074, filed on Oct. 23, 2020, now Pat. No. 11,461,106.

(60) Provisional application No. 62/924,794, filed on Oct. 23, 2019.

(51) Int. Cl.
| | |
|---|---|
| *G06F 9/38* | (2018.01) |
| *G06F 9/30* | (2018.01) |
| *G06F 9/48* | (2006.01) |
| *G06F 9/54* | (2006.01) |
| *G06F 11/3668* | (2025.01) |

(52) U.S. Cl.
CPC ........ *G06F 9/3867* (2013.01); *G06F 9/30101* (2013.01); *G06F 9/30116* (2013.01); *G06F 9/3853* (2013.01); *G06F 9/3854* (2023.08);

*G06F 9/3858* (2023.08); *G06F 9/3861* (2013.01); *G06F 9/3863* (2013.01); *G06F 9/4812* (2013.01); *G06F 9/4843* (2013.01); *G06F 9/542* (2013.01); *G06F 9/544* (2013.01); *G06F 11/368* (2013.01); *G06F 11/3696* (2013.01)

(58) Field of Classification Search
None
See application file for complete search history.

(56) References Cited

U.S. PATENT DOCUMENTS

| | | | |
|---|---|---|---|
| 4,667,285 A | 5/1987 | Suzuki et al. | |
| 5,075,844 A | 12/1991 | Jardine et al. | |
| 5,222,240 A | 6/1993 | Patel | |
| 5,838,988 A | 11/1998 | Panwar et al. | |
| 5,968,159 A | 10/1999 | Mattheis | |
| 6,016,555 A * | 1/2000 | Deao ..................... | G06F 9/3005 712/E9.035 |
| 6,085,312 A | 7/2000 | Abdallah et al. | |
| 6,131,157 A | 10/2000 | Wang et al. | |
| 6,405,300 B1 | 6/2002 | Tremblay et al. | |
| 6,606,686 B1 | 8/2003 | Agarwala et al. | |
| 6,820,190 B1 | 11/2004 | Knebel et al. | |
| 7,539,845 B1 | 5/2009 | Wentzlaff et al. | |

(Continued)

*Primary Examiner* — Andrew M. Lyons

(74) *Attorney, Agent, or Firm* — Kenneth Liu; Frank D. Cimino

(57) ABSTRACT

A method includes executing software code comprising a plurality of execute packets; responsive to an execute packet of the software code being executed by a data processor core, advancing a value of a test counter register; and responsive to the value of the test counter register being equal to a terminal value, triggering an event to be handled by the software code.

18 Claims, 6 Drawing Sheets

(56)          References Cited

U.S. PATENT DOCUMENTS

| | | | |
|---|---|---|---|
| 7,735,072 | B1 | 6/2010 | Altman et al. |
| 8,522,083 | B1 | 8/2013 | Cohen et al. |
| 8,799,872 | B2 | 8/2014 | Levine |
| 8,954,996 | B2 | 2/2015 | Carvalho de Melo et al. |
| 9,465,617 | B1 | 10/2016 | Warkentin et al. |
| 9,946,668 | B1 | 4/2018 | Galijasevic et al. |
| 2002/0029328 | A1 | 3/2002 | Nguyen et al. |
| 2004/0168005 | A1 | 8/2004 | Civlin |
| 2006/0020757 | A1 | 1/2006 | Chaudhry et al. |
| 2007/0094660 | A1 | 4/2007 | Codrescu |
| 2007/0186022 | A1 | 8/2007 | Ren et al. |
| 2007/0234017 | A1 | 10/2007 | Moyer |
| 2009/0240928 | A1* | 9/2009 | Fischer .............. G06F 9/30181 |
| | | | 712/226 |
| 2010/0293342 | A1 | 11/2010 | Morfey et al. |
| 2012/0079102 | A1 | 3/2012 | Damodaran et al. |
| 2012/0131309 | A1 | 5/2012 | Johnson et al. |
| 2012/0144240 | A1 | 6/2012 | Rentschler et al. |
| 2012/0216080 | A1* | 8/2012 | Bansal ................. G06F 11/348 |
| | | | 714/45 |
| 2015/0019840 | A1 | 1/2015 | Anderson et al. |
| 2016/0004626 | A1 | 1/2016 | Jain et al. |
| 2016/0179700 | A1 | 6/2016 | Venkatasubramanian et al. |
| 2018/0004628 | A1 | 1/2018 | Strong et al. |
| 2018/0121319 | A1 | 5/2018 | Ekambaram et al. |
| 2019/0087223 | A1 | 3/2019 | Bhandari et al. |
| 2019/0188111 | A1 | 6/2019 | Ozog et al. |
| 2019/0294536 | A1 | 9/2019 | Avisror et al. |
| 2019/0332520 | A1 | 10/2019 | Myers et al. |
| 2019/0384690 | A1 | 12/2019 | Liu et al. |

* cited by examiner

PROGRAMMABLE EVENT TESTING

CROSS-REFERENCE TO RELATED APPLICATIONS

The present application is a continuation of U.S. patent application Ser. No. 17/079,074, filed Oct. 23, 2020, which claims priority to U.S. Provisional Patent Application No. 62/924,794, filed Oct. 23, 2019, each of which is hereby incorporated by reference in its entirety.

BACKGROUND

Exceptions and interrupts refer to events that are occur outside the normal flow of execution of one or more instructions by a processor core and have a potential to disrupt the executing instructions. Exceptions include events, often unexpected, that are generated within the processor. Interrupts include events, also often unexpected, that are generated outside of the processor.

SUMMARY

In accordance with at least one example of the disclosure, a method includes executing software code comprising a plurality of execute packets; responsive to an execute packet of the software code being executed by a data processor core, advancing a value of a test counter register; and responsive to the value of the test counter register being equal to a terminal value, triggering an event to be handled by the software code.

In accordance with another example of the disclosure, a system includes a data processor core configured to test software code, where the software code includes a plurality of execute packets. The system also includes an event test engine coupled to the data processor core, where the event test engine includes a test counter register. The event test engine is configured to: responsive to an execute packet of the software code being executed by the data processor core, advance a value of the test counter register; and responsive to the value of the test counter register being equal to a terminal value, trigger an event to be handled by the software code.

In accordance with yet another example of the disclosure, a system includes an event test engine configured to couple to a data processor core. The event test engine includes a test counter register. The event test engine is configured to responsive to an execute packet of software code being executed by the data processor core, advance a value of the test counter register; and responsive to the value of the test counter register being equal to a terminal value, trigger an event to be handled by the software code.

BRIEF DESCRIPTION OF THE DRAWINGS

For a detailed description of various examples, reference will now be made to the accompanying drawings in which.

DETAILED DESCRIPTION

Figure 1:
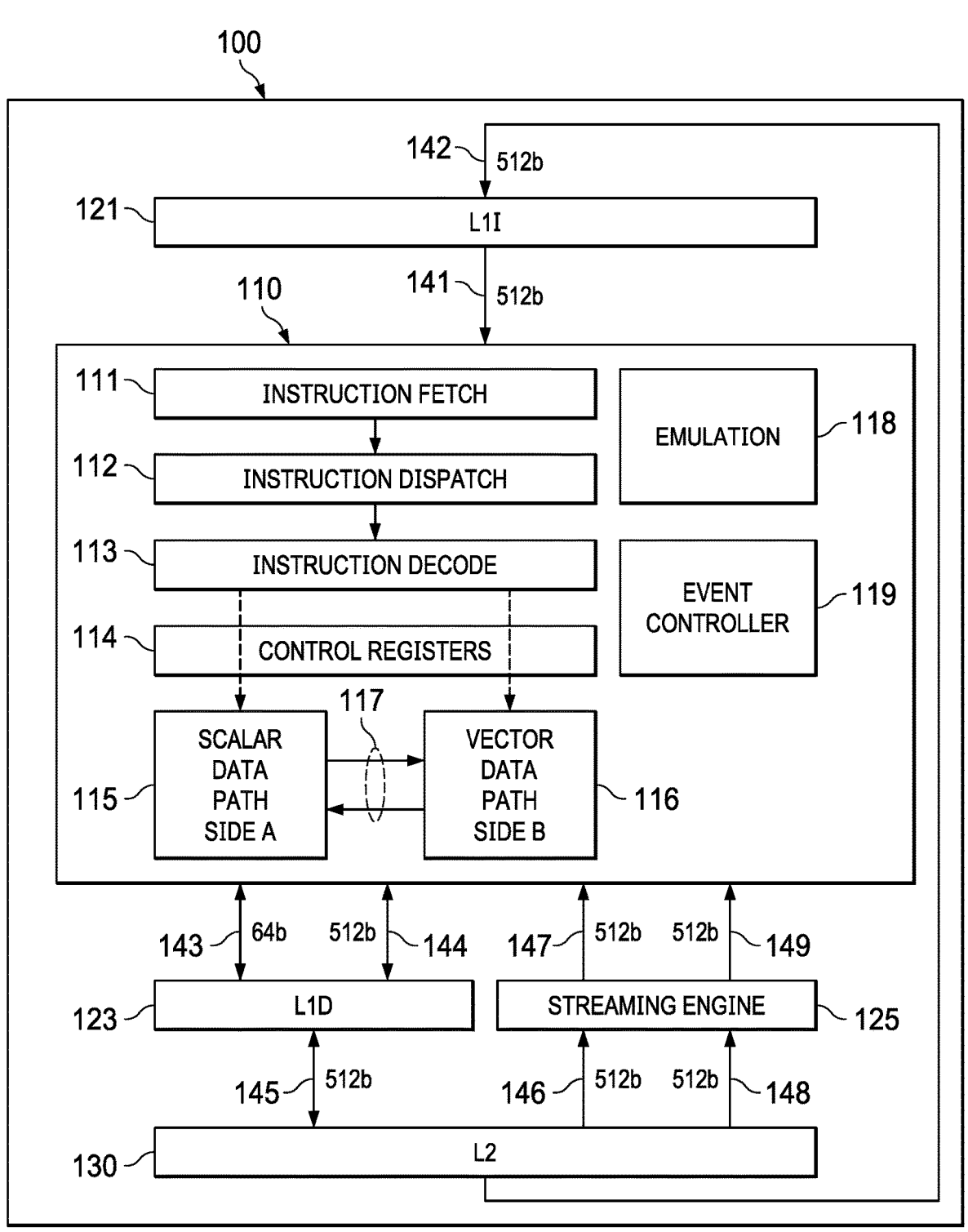
FIG. 1 is a block diagram of a dual scalar/vector datapath processor in accordance with various examples.

In some cases, validating software code entails verifying that an event is able to be handled regardless of where the event occurs during execution of the software code. For example, software code may include a plurality of instructions to be executed, and validating the software code may entail verifying that an event is able to be handled after each instruction is executed. In other examples, the software code includes a plurality of execute packets, each of which includes instructions that are executed in parallel. In this case, validating the software code may entail verifying that an event is able to be handled after each execute packet is executed.

In some cases, event testing is performed by setting a timer that, when expired, triggers an event to be handled. A test loop is used to modify the timer value after triggering an event, such that in the following iteration of the test loop, the event is triggered at a different point in time relative to execution of the software code. However, instructions or execute packets of the software code can stall, and thus the timing of when a particular instruction or execute packet actually executes is variable. As a result, in order to ensure complete testing (e.g., that the software code is able to handle an event after each instruction or execute packet), the testing loop increments the timer value by a relatively small amount after each iteration of the loop (e.g., an amount of time in which an instruction or execute packet is able to be executed in a best-case scenario). However, this increases testing inefficiency due to the possibility of triggering an event multiple times after the same instruction or execute packet, for example when the subsequent instruction Stalls and thus the increased timer value of the current test loop iteration again triggers an event after the instruction or execute packet tested on the previous test loop iteration.

To address the foregoing, examples of this description include an event controller having event test engine. The event test engine includes a software-programmable test counter register. The value of the test counter register is configured to advance responsive to an execute packet (e.g., of software code being tested) being executed by a data processor core. The event test engine is configured to trigger an event in response to the value of the test counter register reaching (e.g., being equal to) a terminal value. In some examples, the triggered event includes an event type and/or an event priority that are specified by a control register of the event test engine.

In one example, test software is configured to program the value of the test counter register to a desired number of execute packets after which the event is triggered. In this example, the value of the test counter register is decremented responsive to an execute packet being executed, and the terminal value is zero.

In another example, the value of the test counter register is initially zero and is subsequently incremented responsive to an execute packet being executed. In this example, test software is configured to specify the terminal value (e.g., by programming a separate terminal value register, the value of which is compared to the test counter register as the test counter register is incremented) as the desired number of execute packets after which the event is triggered.

Regardless of how the value of the test counter register is advanced, the value of the test counter register is advanced responsive to the execution of an execute packet. As a result, when the data processor core is stalled or an execute packet otherwise takes an additional amount of time (e.g., a variable amount) to execute, the test counter register is not advanced. Thus, the efficiency of testing software code is improved by the ability to specify the particular execute packet after which the event will be triggered while avoiding over-testing (e.g., triggering an event multiple times after the same execute packet) that is possible in a timer-based testing approach. These and other examples of this description are described in further detail below.

FIG. 1 is a block diagram a dual scalar/vector datapath processor 100 in accordance with an example of this description. Processor 100 includes separate level one instruction cache (L1I) 121 and level one data cache (L1D) 123. Processor 100 includes a level two combined instruction/data cache (L2) 130 that holds both instructions and data. FIG. 1 shows a connection between level one instruction cache 121 and level two combined instruction/data cache 130 (bus 142). FIG. 1 also shows connection between level one data cache 123 and level two combined instruction/data cache 130 (bus 145). In an example, processor 100 level two combined instruction/data cache 130 stores both instructions to back up level one instruction cache 121 and data to back up level one data cache 123. In this example, level two combined instruction/data cache 130 is further connected to higher level cache and/or main memory. In this example, central processing unit core 110, level one instruction cache 121, level one data cache 123 and level two combined instruction/data cache 130 are formed on a single integrated circuit. This signal integrated circuit optionally includes other circuits.

Central processing unit core 110 fetches instructions from level one instruction cache 121 as controlled by instruction fetch unit 111. Instruction fetch unit 111 determines the next instructions to be executed and recalls a fetch packet sized set of such instructions. The nature and size of fetch packets are further detailed below. In some cases, instructions are directly fetched from level one instruction cache 121 upon a cache hit (if these instructions are stored in level one instruction cache 121). Upon a cache miss (the specified instruction fetch packet is not stored in level one instruction cache 121), these instructions are sought in level two combined cache 130. In this example, the size of a cache line in level one instruction cache 121 equals the size of a fetch packet. The memory locations of these instructions are either a hit in level two combined cache 130 or a miss. A hit is serviced from level two combined cache 130. A miss is serviced from a higher level of cache or from main memory. In some cases, the requested instruction is simultaneously supplied to both level one instruction cache 121 and central processing unit core 110 to speed use.

In an example, central processing unit core 110 includes plural functional units to perform instruction specified data processing tasks. Instruction dispatch unit 112 determines the target functional unit of each fetched instruction. In this example, central processing unit 110 operates as a very long instruction word (VLIW) processor capable of operating on plural instructions in corresponding functional units simultaneously. Preferably a complier organizes instructions in execute packets that are executed together. Instruction dispatch unit 112 directs each instruction to its target functional unit. The functional unit assigned to an instruction is completely specified by the instruction produced by a compiler. The hardware of central processing unit core 110 has no part in this functional unit assignment. In this example, instruction dispatch unit 112 is configured to operate on plural instructions in parallel. The number of such parallel instructions is set by the size of the execute packet, as explained further below.

One part of the dispatch task of instruction dispatch unit 112 is determining whether the instruction is to execute on a functional unit in scalar datapath side A 115 or vector datapath side B 116. An instruction bit within each instruction called the s bit determines which datapath the instruction controls. This will be further detailed below.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As explained further below, in some examples, instructions include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar datapath side A 115 and vector datapath side B 116. This information could be mode information or the like.

The decoded instructions from instruction decode 113 and information stored in control registers 114 are supplied to scalar datapath side A 115 and vector datapath side B 116. As a result functional units within scalar datapath side A 115 and vector datapath side B 116 perform instruction specified data processing operations upon instruction specified data and store the results in an instruction specified data register or registers. Each of scalar datapath side A 115 and vector datapath side B 116 includes plural functional units that preferably operate in parallel. These will be further detailed below in conjunction with FIG. 2. There is a datapath 117 between scalar datapath side A 115 and vector datapath side B 116 permitting data exchange.

Central processing unit core 110 includes further non-instruction based modules. Emulation unit 118 permits determination of the machine state of central processing unit core 110 in response to instructions. This capability may be employed for algorithmic development. Event controller 119 is a unit that enables central processing unit core 110 to be responsive to external, asynchronous events (interrupts) and to respond to attempts to perform improper operations (exceptions).

Central processing unit core 110 includes streaming engine 125. Streaming engine 125 of this example supplies two data streams from predetermined addresses typically cached in level two combined cache 130 to register files of vector datapath side B 116. This provides controlled data movement from memory (as cached in level two combined cache 130) directly to functional unit operand inputs. This is further detailed below.

FIG. 1 includes exemplary data widths of busses between various parts. Level one instruction cache 121 supplies instructions to instruction fetch unit 111 via bus 141. Bus 141 is preferably a 512-bit bus. Bus 141 is unidirectional from level one instruction cache 121 to central processing unit 110. Level two combined cache 130 supplies instructions to level one instruction cache 121 via bus 142. Bus 142 is preferably a 512-bit bus. Bus 142 is unidirectional from level two combined cache 130 to level one instruction cache 121.

Level one data cache 123 exchanges data with register files in scalar datapath side A 115 via bus 143. Bus 143 is preferably a 64-bit bus. Level one data cache 123 exchanges data with register files in vector datapath side B 116 via bus 144. Bus 144 is preferably a 512-bit bus. Busses 143 and 144 are shown as bidirectional supporting both central processing unit 110 data reads and data writes. Level one data cache 123 exchanges data with level two combined cache 130 via bus 145. Bus 145 is preferably a 512-bit bus. Bus 145 is shown as bidirectional supporting cache service for both central processing unit 110 data reads and data writes.

In some cases, CPU data requests are directly fetched from level one data cache 123 upon a cache hit (if the requested data is stored in level one data cache 123). Upon a cache miss (the specified data is not stored in level one data cache 123), this data is sought in level two combined cache 130. The memory locations of this requested data is either a hit in level two combined cache 130 or a miss. A hit is serviced from level two combined cache 130. A miss is serviced from another level of cache or from main memory. In some cases, the requested instruction is simultaneously supplied to both level one data cache 123 and central processing unit core 110 to speed use.

Level two combined cache 130 supplies data of a first data stream to streaming engine 125 via bus 146. Bus 146 is preferably a 512-bit bus. Streaming engine 125 supplies data of this first data stream to functional units of vector datapath side B 116 via bus 147. Bus 147 is preferably a 512-bit bus. Level two combined cache 130 supplies data of a second data stream to streaming engine 125 via bus 148. Bus 148 is preferably a 512-bit bus. Streaming engine 125 supplies data of this second data stream to functional units of vector datapath side B 116 via bus 149. Bus 149 is preferably a 512-bit bus. Busses 146, 147, 148 and 149 are shown as unidirectional from level two combined cache 130 to streaming engine 125 and to vector datapath side B 116 in accordance with various examples of this description.

Streaming engine 125 data requests are directly fetched from level two combined cache 130 upon a cache hit (if the requested data is stored in level two combined cache 130). Upon a cache miss (the specified data is not stored in level two combined cache 130), this data is sought from another level of cache or from main memory. It is technically feasible in some examples for level one data cache 123 to cache data not stored in level two combined cache 130. If such operation is supported, then upon a streaming engine 125 data request that is a miss in level two combined cache 130, level two combined cache 130 should snoop level one data cache 123 for the stream engine 125 requested data. If level one data cache 123 stores this data, its snoop response would include the data, which is then supplied to service the streaming engine 125 request. If level one data cache 123 does not store this data, its snoop response would indicate this and level two combined cache 130 must service this streaming engine 125 request from another level of cache or from main memory.

In an example, both the level one data cache 123 and the level two combined cache 130 may be configured as selected amounts of cache or directly addressable memory in accordance with U.S. Pat. No. 6,606,686 entitled UNIFIED MEMORY SYSTEM ARCHITECTURE INCLUDING CACHE AND DIRECTLY ADDRESSABLE STATIC RANDOM ACCESS MEMORY.

Figure 2:
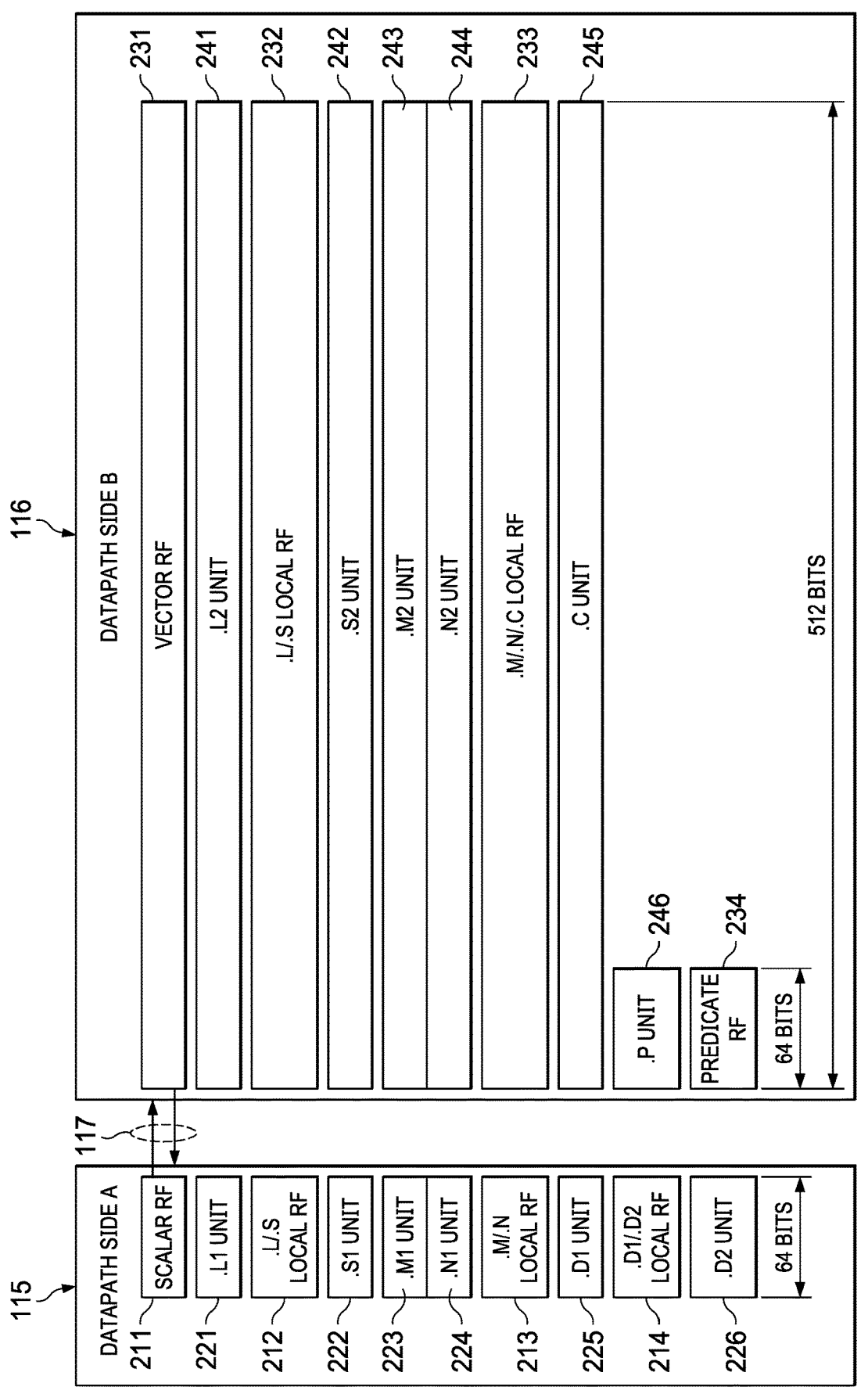
FIG. 2 is a block diagram of registers and functional units in the dual scalar/vector datapath processor illustrated in FIG. 1 and in accordance with various examples.

FIG. 2 is a block diagram that includes further details of functional units and register files within scalar datapath side A 115 and vector datapath side B 116. Scalar datapath side A 115 includes global scalar register file 211, L1/S1 local register file 212, M1/N1 local register file 213 and D1/D2 local register file 214. Scalar datapath side A 115 includes L1 unit 221, S1 unit 222, M1 unit 223, N1 unit 224, D1 unit 225 and D2 unit 226. Vector datapath side B 116 includes global vector register file 231, L2/S2 local register file 232, M2/N2/C local register file 233 and predicate register file 234. Vector datapath side B 116 includes L2 unit 241, S2 unit 242, M2 unit 243, N2 unit 244, C unit 245 and P unit 246. There are limitations upon which functional units are permitted to read from or write to which register files. These will be detailed below.

Scalar datapath side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. In some examples, the result is written into an instruction specified register of global scalar register file 211, L1/S1 local register file 212, M1/N1 local register file 213 or D1/D2 local register file 214.

Scalar datapath side A 115 includes S1 unit 222. S1 unit 222 generally accepts two 64-bit operands and produces one 64-bit result. The two operands are each recalled from an instruction specified register in either global scalar register file 211 or L1/S1 local register file 212. S1 unit 222 preferably performs the same type operations as L1 unit 221. There optionally are variations between the data processing operations supported by L1 unit 221 and S1 unit 222. For example, the result can be written into an instruction specified register of global scalar register file 211, L1/S1 local register file 212, M1/N1 local register file 213 or D1/D2 local register file 214.

Scalar datapath side A 115 includes M1 unit 223. M1 unit 223 generally accepts two 64-bit operands and produces one 64-bit result. The two operands are each recalled from an instruction specified register in either global scalar register file 211 or M1/N1 local register file 213. M1 unit 223 preferably performs the following instruction selected operations: 8-bit multiply operations; complex dot product operations; 32-bit bit count operations; complex conjugate multiply operations; and bit-wise Logical Operations, moves, adds and subtracts. The result may be written into an instruction specified register of global scalar register file 211, L1/S1 local register file 212, M1/N1 local register file 213 or D1/D2 local register file 214.

Scalar datapath side A 115 includes N1 unit 224. N1 unit 224 generally accepts two 64-bit operands and produces one 64-bit result. The two operands are each recalled from an instruction specified register in either global scalar register file 211 or M1/N1 local register file 213. N1 unit 224 preferably performs the same type operations as M1 unit 223. There are certain double operations (called dual issued instructions) that employ both the M1 unit 223 and the N1 unit 224 together. In these cases, the result is written into an instruction specified register of global scalar register file 211, L1/S1 local register file 212, M1/N1 local register file 213 or D1/D2 local register file 214.

Scalar datapath side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. D1 unit 225 and D2 unit 226 preferably also perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result is written into an instruction specified register of global scalar register file 211, L1/S1 local register file 212, M1/N1 local register file 213 or D1/D2 local register file 214.

Vector datapath side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. L2 unit 241 preferably performs instruction similar to L1 unit 221 except on wider 512-bit data. The result is written into an instruction specified register of global vector register file 231, L2/S2 local register file 232, M2/N2/C local register file 233 or predicate register file 234.

Vector datapath side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. S2 unit 242 preferably performs instructions similar to S1 unit 222. The result is written into an instruction specified register of global vector register file 231, L2/S2 local register file 232, M2/N2/C local register file 233 or predicate register file 234.

Vector datapath side B 116 includes M2 unit 243. M2 unit 243 generally accepts two 512-bit operands and produces one 512-bit result. The two operands are each recalled from an instruction specified register in either global vector register file 231 or M2/N2/C local register file 233. M2 unit 243 preferably performs instructions similar to M1 unit 223 except on wider 512-bit data. The result is written into an instruction specified register of global vector register file 231, L2/S2 local register file 232 or M2/N2/C local register file 233.

Vector datapath side B 116 includes N2 unit 244. N2 unit 244 generally accepts two 512-bit operands and produces one 512-bit result. The two operands are each recalled from an instruction specified register in either global vector register file 231 or M2/N2/C local register file 233. N2 unit 244 preferably performs the same type operations as M2 unit 243. There are certain double operations (called dual issued instructions) that employ both M2 unit 243 and the N2 unit 244 together. The result is written into an instruction specified register of global vector register file 231, L2/S2 local register file 232 or M2/N2/C local register file 233.

Vector datapath side B 116 includes C unit 245. C unit 245 generally accepts two 512-bit operands and produces one 512-bit result. The two operands are each recalled from an instruction specified register in either global vector register file 231 or M2/N2/C local register file 233. C unit 245 preferably performs: "Rake" and "Search" instructions; up to 512 2-bit PN*8-bit multiplies I/Q complex multiplies per clock cycle; 8-bit and 16-bit Sum-of-Absolute-Difference (SAD) calculations, up to 512 SADs per clock cycle; horizontal add and horizontal min/max instructions; and vector permutes instructions. C unit 245 also contains 4 vector control registers (CUCR0 to CUCR3) used to control certain operations of C unit 245 instructions. Control registers CUCR0 to CUCR3 are used as operands in certain C unit 245 operations. Control registers CUCR0 to CUCR3 are preferably used: in control of a general permutation instruction (VPERM); and as masks for SIMD multiple DOT product operations (DOTPM) and SIMD multiple Sum-of-Absolute-Difference (SAD) operations. Control register CUCR0 is preferably used to store the polynomials for Galois Field Multiply operations (GFMPY). Control register CUCR1 is preferably used to store the Galois field polynomial generator function.

Vector datapath side B 116 includes P unit 246. P unit 246 performs basic logic operations on registers of local predicate register file 234. P unit 246 has direct access to read from and write to predication register file 234. These operations include single register unary operations such as: NEG (negate) which inverts each bit of the single register; BITCNT (bit count) which returns a count of the number of bits in the single register having a predetermined digital state (1 or 0); RMBD (right most bit detect) which returns a number of bit positions from the least significant bit position (right most) to a first bit position having a predetermined digital state (1 or 0); DECIMATE which selects every instruction specified Nth (1, 2, 4, etc.) bit to output; and EXPAND which replicates each bit an instruction specified N times (2, 4, etc.). These operations include two register binary operations such as: AND a bitwise AND of data of the two registers; NAND a bitwise AND and negate of data of the two registers; OR a bitwise OR of data of the two registers; NOR a bitwise OR and negate of data of the two registers; and XOR exclusive OR of data of the two registers. These operations include transfer of data from a predicate register of predicate register file 234 to another specified predicate register or to a specified data register in global vector register file 231. A commonly expected use of P unit 246 includes manipulation of the SIMD vector comparison results for use in control of a further SIMD vector operation. The BITCNT instruction may be used to count the number of 1's in a predicate register to determine the number of valid data elements from a predicate register.

Still referring to FIG. 2, crosspath 117 permits limited exchange of data between scalar datapath side A 115 and vector datapath side B 116. During each operational cycle one 64-bit data word can be recalled from global scalar register file A 211 for use as an operand by one or more functional units of vector datapath side B 116 and one 64-bit data word can be recalled from global vector register file 231 for use as an operand by one or more functional units of scalar datapath side A 115. Any scalar datapath side A 115 functional unit (L1 unit 221, S1 unit 222, M1 unit 223, N1 unit 224, D1 unit 225 and D2 unit 226) is configured to read a 64-bit operand from global vector register file 231. This 64-bit operand is the least significant bits of the 512-bit data in the accessed register of global vector register file 231. Plural scalar datapath side A 115 functional units are configured to employ the same 64-bit crosspath data as an operand during the same operational cycle. However, only one 64-bit operand is transferred from vector datapath side B 116 to scalar datapath side A 115 in any single operational cycle. Any vector datapath side B 116 functional unit (L2 unit 241, S2 unit 242, M2 unit 243, N2 unit 244, C unit 245 and P unit 246) is configured to read a 64-bit operand from global scalar register file 211. If the corresponding instruction is a scalar instruction, the crosspath operand data is treated as any other 64-bit operand. If the corresponding instruction is a vector instruction, the upper 448 bits of the operand are zero filled. Plural vector datapath side B 116 functional units are configured to employ the same 64-bit crosspath data as an operand during the same operational cycle. Only one 64-bit operand is transferred from scalar datapath side A 115 to vector datapath side B 116 in any single operational cycle.

Streaming engine 125 transfers data in certain restricted circumstances. Streaming engine 125 controls two data streams. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have a fixed sequence of elements. Thus, programs cannot seek randomly within the stream. The stream data is read-only while active. Programs cannot write to a stream while simultaneously reading from it. Once a stream is opened, the streaming engine 125: calculates the address; fetches the defined data type from level two unified cache (in some cases, including cache service from a higher level memory); performs data type manipulation such as zero extension, sign extension, data element sorting/swapping such as matrix transposition; and delivers the data directly to the programmed data register file within CPU 110. Streaming engine 125 is thus useful for real-time digital filtering operations on well-behaved data. Streaming engine 125 frees these memory fetch tasks from the corresponding CPU enabling other processing functions.

Streaming engine 125 provides the following benefits. Streaming engine 125 permits multi-dimensional memory accesses. Streaming engine 125 increases the available bandwidth to the functional units. Streaming engine 125 minimizes the number of cache miss stalls since the stream buffer bypasses level one data cache 123. Streaming engine 125 reduces the number of scalar operations to maintain a loop. Streaming engine 125 manages address pointers. Streaming engine 125 handles address generation automatically freeing up the address generation instruction slots and D1 unit 225 and D2 unit 226 for other computations.

CPU 110 operates on an instruction pipeline. Instructions are fetched in instruction packets of fixed length further described below. All instructions entail the same number of pipeline phases for fetch and decode, but entail a varying number of execute phases.

Figure 3:
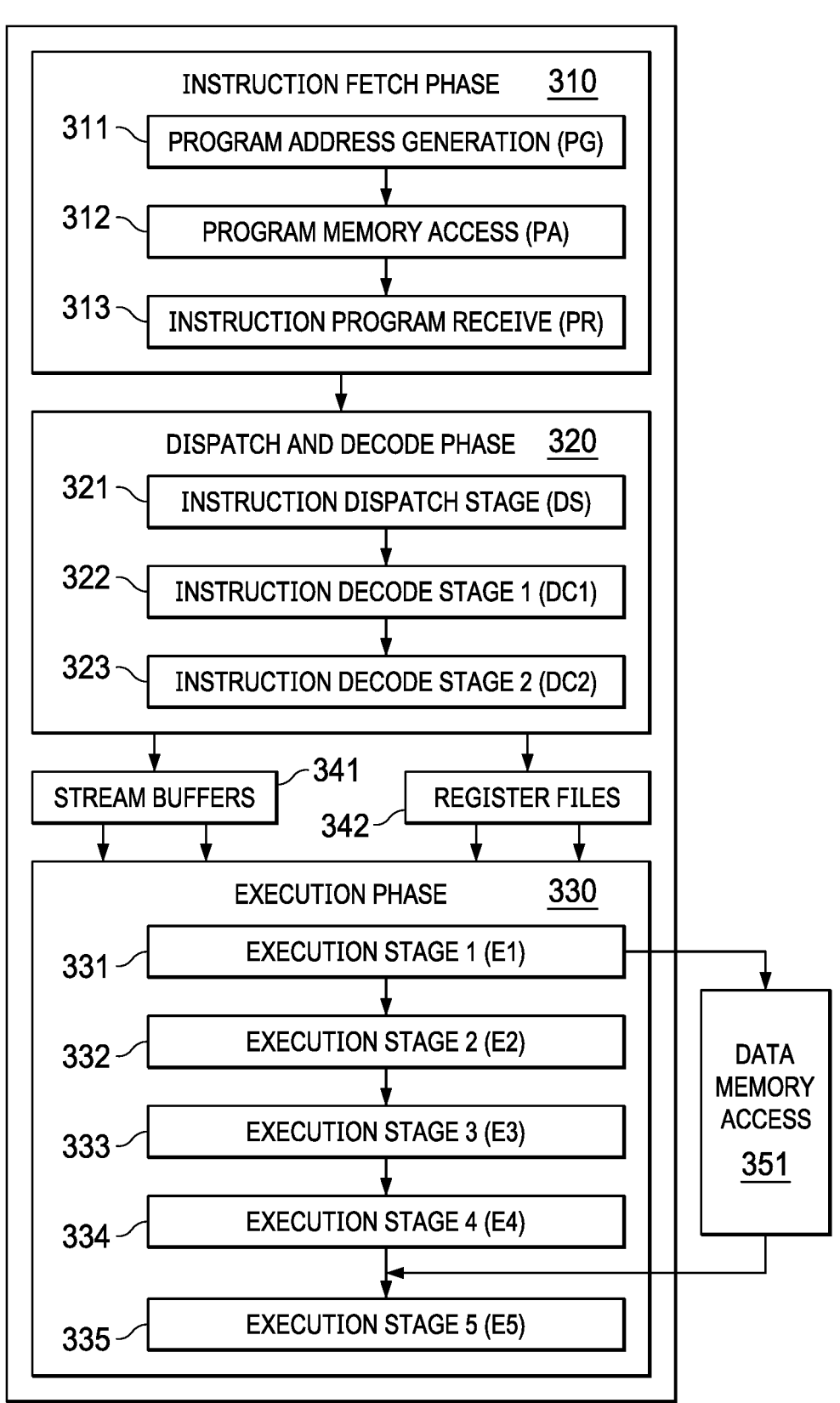
FIG. 3 is a block diagram of pipeline phases of the central processing unit in accordance with various examples.

FIG. 3 is a block diagram that shows the following pipeline phases: program fetch phase 310, dispatch and decode phases 320 and execution phases 330. Program fetch phase 310 includes three stages for all instructions. Dispatch and decode phases 320 include three stages for all instructions. Execution phase 330 includes one to four stages dependent on the instruction.

Fetch phase 310 includes program address generation stage 311 (PG), program access stage 312 (PA) and program receive stage 313 (PR). During program address generation stage 311 (PG), the program address is generated in the CPU and the read request is sent to the memory controller for the level one instruction cache L1I. During the program access stage 312 (PA) the level one instruction cache L1I processes the request, accesses the data in its memory and sends a fetch packet to the CPU boundary. During the program receive stage 313 (PR) the CPU registers the fetch packet.

Figure 4:
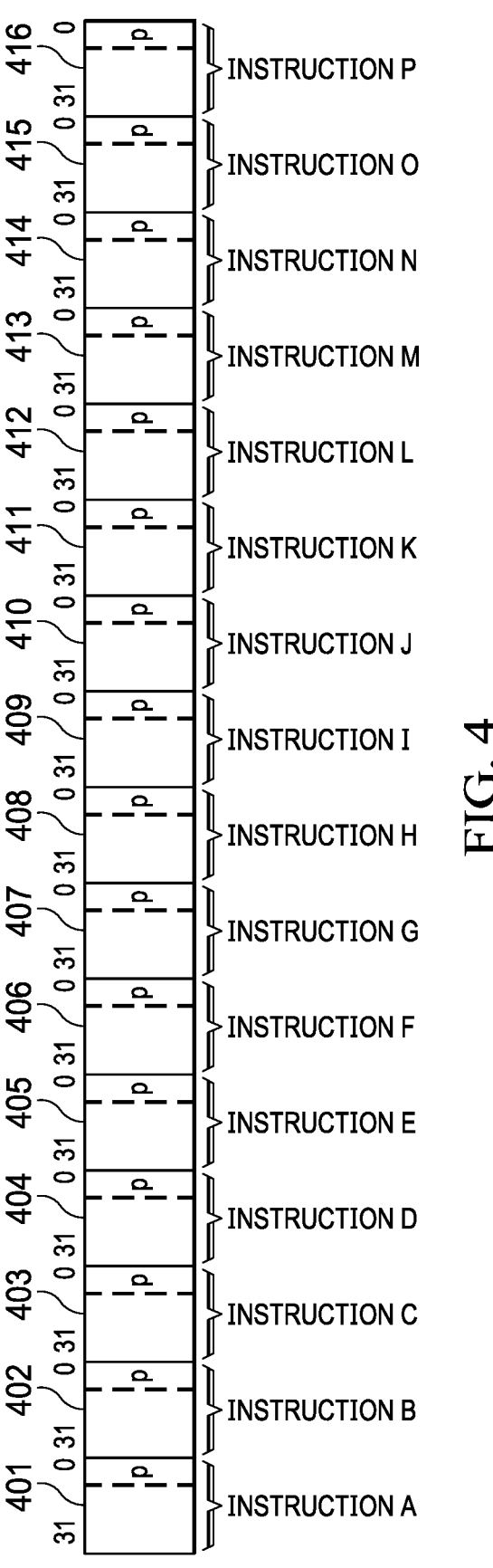
FIG. 4 is an example of a single fetch packet including multiple instructions in accordance with various examples.

In some examples, instructions are fetched as sixteen 32-bit wide slots, constituting a fetch packet, at a time. FIG. 4 illustrates 16 instructions 401 to 416 of a single fetch packet. Fetch packets are aligned on 512-bit (16-word) boundaries. An example employs a fixed 32-bit instruction length. In some examples, fixed-length instructions enable easy decoder alignment. A properly aligned instruction fetch can load plural instructions into parallel instruction decoders. Such a properly aligned instruction fetch can be achieved by predetermined instruction alignment as a result of being stored in memory (e.g., fetch packets aligned on 512-bit boundaries) coupled with a fixed instruction packet fetch. An aligned instruction fetch permits operation of parallel decoders on instruction-sized fetched bits. Variable length instructions entail an initial step of locating each instruction boundary before they can be decoded. A fixed length instruction set generally permits more regular layout of instruction fields. This simplifies the construction of each decoder which is an advantage for a wide issue VLIW central processor.

The execution of the individual instructions is partially controlled by a p bit in each instruction. This p bit is preferably bit 0 of the 32-bit wide slot. The p bit determines whether an instruction executes in parallel with a next instruction. Instructions are scanned from lower to higher address. If the p bit of an instruction is 1, then the next following instruction (higher memory address) is executed in parallel with (in the same cycle as) that instruction. If the p bit of an instruction is 0, then the next following instruction is executed in the cycle after the instruction.

CPU 110 and level one instruction cache L1I 121 pipelines are de-coupled from each other. Fetch packet returns from level one instruction cache L1I can take different number of clock cycles, depending on external circumstances such as whether there is a hit in level one instruction cache 121 or a hit in level two combined cache 130. Therefore program access stage 312 (PA) can take several clock cycles instead of 1 clock cycle as in the other stages.

The instructions executing in parallel constitute an execute packet. In an example, an execute packet can contain up to sixteen instructions (e.g., a fetch packet in which the p bit for each instruction is a 1). In some cases, no two instructions in an execute packet are configured to use the same functional unit. A slot is one of five types: 1) a self-contained instruction executed on one of the functional units of CPU 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instruction; 3) a branch instruction; 4) a constant field extension; and 5) a conditional code extension. Some of these slot types will be further explained below.

Dispatch and decode phases 320 include instruction dispatch to appropriate execution unit stage 321 (DS), instruction pre-decode stage 322 (DC1); and instruction decode, operand reads stage 323 (DC2). During instruction dispatch to appropriate execution unit stage 321 (DS), the fetch packets are split into execute packets and assigned to the appropriate functional units. During the instruction pre-decode stage 322 (DC1), the source registers, destination registers and associated paths are decoded for the execution of the instructions in the functional units. During the instruction decode, operand reads stage 323 (DC2), more detailed unit decodes are done, as well as reading operands from the register files.

Execution phases 330 include execution stages 331 to 335 (E1 to E5). Different types of instructions entail different numbers of these stages to complete their execution. These stages of the pipeline play an important role in understanding the device state at CPU cycle boundaries.

During execute 1 stage 331 (E1) the conditions for the instructions are evaluated and operands are operated on. As illustrated in FIG. 3, execute 1 stage 331 may receive operands from a stream buffer 341 and one of the register files shown schematically as 342. For load and store instructions, address generation is performed and address modifications are written to a register file. For branch instructions, branch fetch packet in PG phase is affected. As illustrated in FIG. 3, load and store instructions access memory here shown schematically as memory 351. For single-cycle instructions, results are written to a destination register file. This assumes that any conditions for the instructions are evaluated as true. If a condition is evaluated as false, the instruction does not write any results or have any pipeline operation after execute 1 stage 331.

During execute 2 stage 332 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 333 (E3) data memory accesses are performed. Any multiply instructions that saturate results set the SAT bit in the control status register (CSR) if saturation occurs. For 3-cycle instructions, results are written to a destination register file.

During execute 4 stage 334 (E4) load instructions bring data to the CPU boundary. For 4-cycle instructions, results are written to a destination register file.

During execute 5 stage 335 (E5) load instructions write data into a register. This is illustrated schematically in FIG. 3 with input from memory 351 to execute 5 stage 335.

As explained above, validating software code to ensure events can be handled after each execute packet using a timer-based testing approach is inefficient due to the possibility of triggering an event multiple times after the same execute packet.

Figure 5:
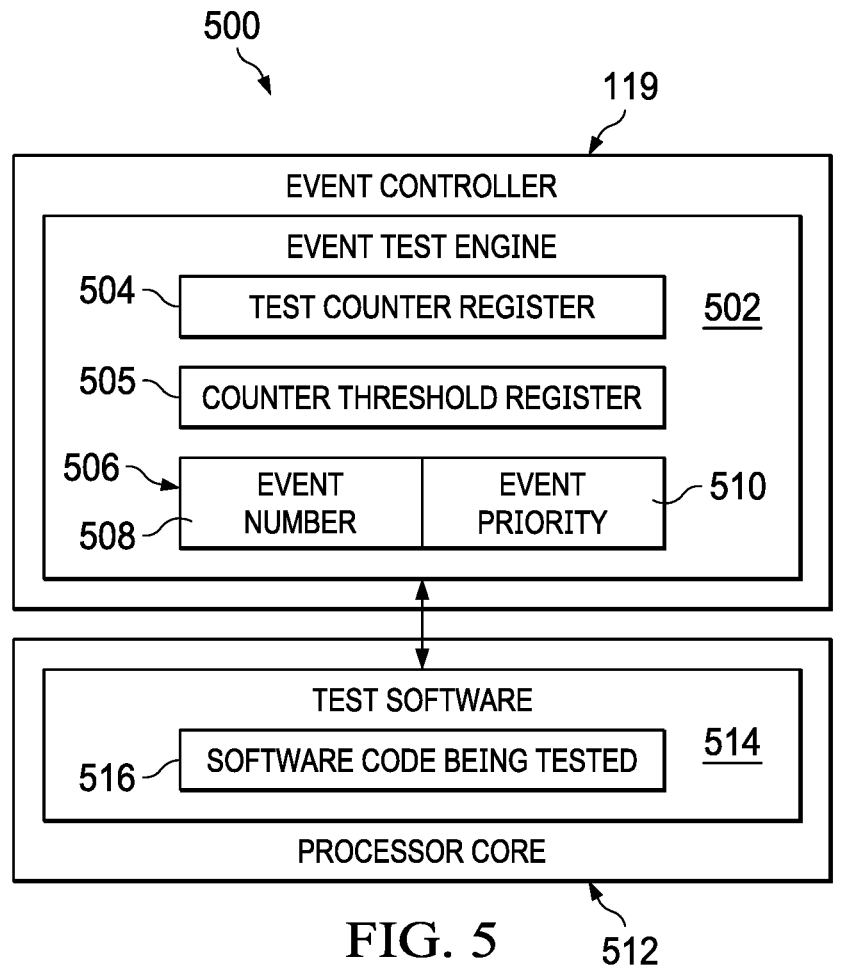
FIG. 5 is a block diagram showing an event controller in accordance with various examples.

FIG. 5 is a block diagram of a system 500 for programmable event testing. The system 500 includes event controller 119, described above with respect to FIG. 1. In examples of this description, the event controller 119 is configured to perform various functionality related to the handling, processing, or disposition of events. As explained above, events include both exceptions and interrupts. In the example of FIG. 5, the event controller 119 includes an event test engine 502, which represents software, hardware, or a combination thereof configured to perform event testing as described herein.

In particular, the event test engine 502 includes a test counter register 504 and a counter threshold register 505. In some examples, the event test engine 502 increments a value stored in the test counter register 504 in response to an execute packet being executed until the test counter register 504 is equal to a terminal value stored in the counter threshold register 505, at which time an event is triggered. Similarly, in some examples, the test engine 502 decrements a value stored in the test counter register 504 (e.g., starting from a programmed test value or from a test value stored in the counter threshold register 505) in response to an execute packet being executed until the test counter register 504 is equal to a terminal value, such as zero, at which time an event is triggered.

The event test engine may also include a control register 506 that has an event number field 508 and an event priority field 510. The event number field 508 specifies an event type of an event that is triggered by the event test engine 502 responsive to a condition being met (e.g., the test counter register 504 value being equal to a terminal value such as zero in the case of decrementing the test counter register 504 or a value stored in the counter threshold register 505 in the case of incrementing the test counter register). The event priority field 510 specifies an event priority of the event that is triggered by the event test engine 502 responsive to a condition being met (e.g., the test counter register 504 value being equal to the terminal value). In an example, the test counter register 504, the counter threshold register 505, and the control register 506 are software-programmable registers.

The system 500 also includes a processor core 512, which is configured to execute test software 514. In FIG. 5, the processor core 512 and the event controller 119 (and thus the event test engine 502) are shown as separate entities for ease of discussion of their respective functionality. However, in other examples (e.g., as shown in FIG. 1), the event controller 119 is part of the processor core 512, although the processor core 512 is additionally configured to execute test software 514 independently of, but in conjunction with, carrying out the functionality of the event test engine 502. The test software 514 is configured to perform various functionality to test or validate other software code 516, in part by controlling the event test engine 502 to trigger events to be handled by the software code being tested 516.

As described above, the value of the test counter register 504 is configured to advance responsive to an execute packet (e.g., of the software code being tested 516 by the test software 514) being executed by the data processor core 512. The event test engine 502 is configured to trigger an event in response to the value of the test counter register 504 reaching (e.g., being equal to) a terminal value. In some examples, the triggered event includes an event type specified by the event number 508 field and/or an event priority specified by the event priority field 510 of the control register 506.

Regardless of how the value of the test counter register 504 is advanced, the value of the test counter register 504 is advanced responsive to the execution of an execute packet of the software code 516 by the processor core 512. As a result, when the data processor core 512 is stalled or an execute packet otherwise takes an additional amount of time (e.g. a variable amount) to execute, the test counter register 504 is not advanced. Thus, the efficiency of testing software code 516 is improved by the ability to specify the particular execute packet after which the event will be triggered while avoiding over-testing (e.g., triggering an event multiple times after the same execute packet) that is possible in a timer-based testing approach.

In one example, the test software 514 tests the software code 516 by iteratively executing the software code 516, such as inside of a loop. The test software 514 may be configured to program the test counter register 504 with a different value during different iterations of the test loop, so that the point which an event is triggered to be handled by the software code 516 varies from one iteration of the test loop to a subsequent iteration of the test loop. The following example is based on the assumption that the test counter register 504 decrements responsive to an execute packet of the software code 516 being executed, and an event is triggered responsive to the value of the test counter register 504 being equal to 0. In an example first iteration of the test loop, the test software 514 loads a value of 1 into the test counter register 504 and executes the software code 516. Thus, in the first iteration of the test loop, an event is triggered after the first execute packet of the software code 516. In an example second iteration of the test loop, the test software 514 loads a value of 2 into the test counter register 504 and executes the software code 516. Thus, in the second iteration of the test loop, an event is triggered after the second execute packet of the software code 516. The test loop of test software 514 may continue to iterate in this manner until the software code 516 has been suitably tested to handle events.

In some examples, the software code being tested 516 (generally, a task being executed by the processor core 512) has a certain priority level. In some examples, the test software 514 is configured to modify the event priority field 510 to prevent or allow an event to be triggered responsive to the value of the test count register 504 being equal to the terminal value. For example, the test software 514 is configured to modify the event priority field 510 to be a lower priority than the priority of the software code being tested 516 to prevent the event from being triggered responsive to the value of the test count register 504 being equal to the terminal value. Similarly, the test software 514 is configured to modify the event priority field 510 to be a higher priority than the priority of the software code being tested 516 to allow the event to be triggered responsive to the value of the test count register 504 being equal to the terminal value.

For example, it may be desired to trigger events after each of the first 10 execute packets of the software code 516, not to trigger events after each of the second ten execute packets of the software code 516, and then to trigger events after the remaining execute packets of the software code 516. In this example, the test software 514 is configured to write a priority level to the event priority field 510 that is higher than the priority of the software code 516 while the test software 514 iterates through a test loop to test (e.g., trigger events) the first 10 execute packets of the software code 516. However, as the test software 514 iterates through the test loop to test each of the second 10 execute packets of the software code 516, the test software 514 is configured to write a priority level to the event priority field 510 that is lower than the priority of the software code 516. As a result of the events triggered by the event test engine 502 having a lower priority than the software code 516, the software code 516 does not handle events triggered after each of the second 10 execute packets. For the remainder of iterations through the test loop, the test software 514 is configured to write a priority level to the event priority field 510 that is higher than the priority of the software code 516. As a result, the test software 514 can be configured to selectively trigger events (or prevent triggering of events) after certain execute packets of the software code 516 by varying the value of the event priority field 510. Additionally, the test software 514 can be configured to vary the value of the event number field 508 to alter the type of event triggered after certain execute packets of the software code 516.

Figure 6:
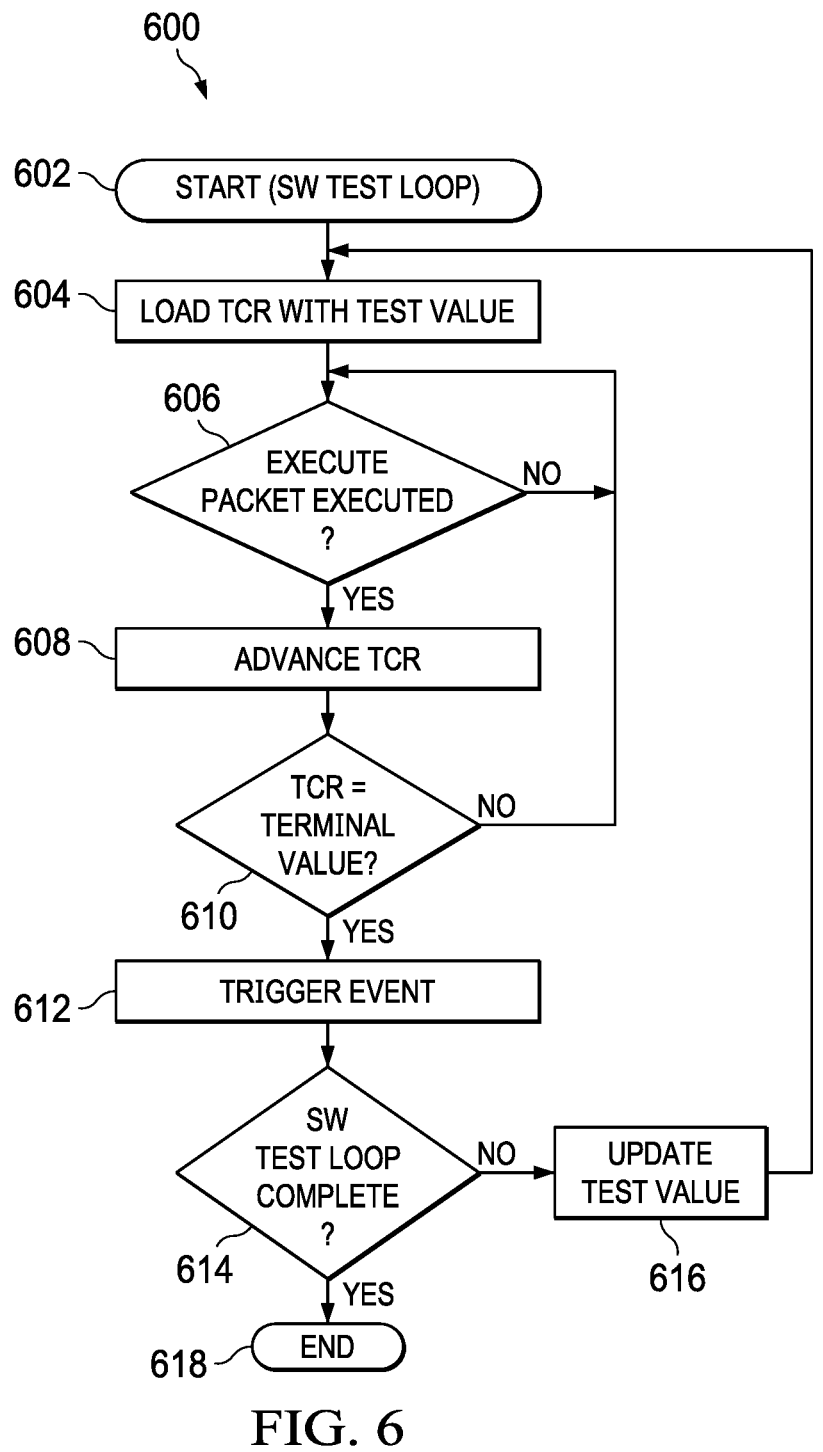
FIG. 6 is a flow chart of a method for programmable event testing in accordance with various examples.

FIG. 6 is a flow chart of a method 600 of software-programmable event testing in accordance with examples of this disclosure. In the example of FIG. 6, various portions of the method 600 are carried out by the test software 514 in conjunction with the event test engine 502. The method 600 begins in block 602 in which a test loop of the test software 514 begins. For ease of discussion, it is assumed that, after the test counter register 504 is programmed with a test value by the test software 514, the test counter register 504 is configured to decrement responsive to an execute packet of the software code 516 being executed. It is further assumed that the event test engine 502 is configured to trigger an event to be handled by the software code 516 responsive to the value of the test counter register 504 being equal to zero. Thus, in block 602, the test loop of the test software 514 begins with an initial test value for the test counter register 504 (e.g., an initial value of 1, so that the first iteration of the test loop triggers an event after the first execute packet of the software code 516).

The method 600 then continues in block 604 with loading the test count register 504 with the test value (e.g., the initial test value of 1 in this case). The method 600 proceeds to block 606 in which it is determined whether an execute packet of the software code 516 has executed. If an execute packet has not executed, the method 600 remains in block 606. Once an execute packet has executed, the method 600 proceeds to block 608, in which the test counter register 504 is advanced (e.g., decremented).

The method 600 then continues to block 610, in which it is determined whether the test counter register 504 is equal to a terminal value (e.g., 0 in this example). Because the initial test value loaded to the test counter register 504 was 1 (in block 604), and the test counter register 504 has been decremented (in block 608) to 0 responsive to the first execute packet of the software code 516 being executed, the method 600 proceeds to block 612 in which the event test engine 502 triggers an event that may or may not be handled by the software code 516 depending on the value in priority stored in the event priority field 510.

However, in a subsequent iteration through the test loop (e.g., where the test value loaded to the test counter register 504 was greater than 1), after the first execute packet of the software code 516 was executed, the value of the test counter register 504 would have been greater than 0 in block 610. As a result, the method 600 reverts back to block 606 and block 608, in which the test counter register 504 is again advanced responsive to a subsequent execute packet of the software code 516 being executed.

After an event is triggered by the event test engine 502 in block 612, the method 600 proceeds to block 614 in which it is determined whether the test loop of the test software 514 is complete. For example, the test loop is complete when the software code 516 has been verified to handle events being triggered following all of the execute packets of the software code 516. In another example, the test loop is complete when the software code 516 event handling has been sufficiently verified according to development specifications.

If the test loop is not complete in block 614, the method 600 continues to block 616 in which the test value is updated. Continuing the example above, updating the test value includes incrementing the test value (e.g., from 1 to 2) such that the subsequent iteration of the test loop of test software 514 tests the software code 516 ability to handle an event following the subsequent execute packet from the execute packet that was just tested. The method 600 then reverts to block 604 in which the updated test value is loaded into the test counter register 504, and the method 600 proceeds as described above.

If the test loop is complete in block 614, the method 600 ends in block 618. In block 618, the software code 516 has been verified to handle events being triggered following all of the execute packets of the software code 516.

As described, the method 600 refers to the event test engine 502 being configured to decrement the test counter register 504 responsive to an execute packet of the software code 516 being executed. The method 600 also refers to the event test engine 502 triggering an event responsive to the test counter register 504 value being equal to zero. However, as described above, in other examples, the value of the test counter register 504 is initially zero. In this example, the event test engine 502 is configured to increment the test counter register 504 responsive to an execute packet of the software code 516 being executed. In this example, test software 514 is configured to specify the terminal value (e.g., by programming a separate terminal value register, the value of which is compared to the test counter register as the test counter register is incremented) as the desired number of execute packets after which the event is triggered.

Regardless of how the value of the test counter register 504 is advanced, the value of the test counter register 504 is advanced responsive to the execution of an execute packet of the software code 516 by the processor core 512. As a result, when the data processor core 512 is stalled or an execute packet otherwise takes an additional amount of time (e.g., a variable amount) to execute, the test counter register 504 is not advanced. Thus, the efficiency of testing software code 516 is improved by the ability to specify the particular execute packet after which the event will be triggered while avoiding over-testing (e.g., triggering an event multiple times after the same execute packet) that is possible in a timer-based testing approach.

In the foregoing discussion and in the claims, the terms "including" and "comprising" are used in an open-ended fashion, and thus mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is illustrative of the principles and various embodiments of the present disclosure. Numerous variations and modifications will become apparent to those skilled in the art once the above disclosure is fully appreciated. The following claims should be interpreted to embrace all such variations and modifications.

What is claimed is:

1. An integrated circuit device comprising:
an event test circuit that includes:

a test counter register configured to store a count of packets of instructions associated with software code being tested on the integrated circuit device;
a first register configured to store an identifier of an event; and
a second register configured to store a first priority level of the event for a first set of one or more packets of instructions and to store a second priority level of the event for a second set of one or more packets of instructions, wherein the first and second sets of packets of instructions are part of the count, wherein the packets of instructions associated with the software code has a third priority level and the first priority level is higher than the third priority level and the second priority level is lower than the third priority level;
wherein the event test circuit is configured to:
trigger the event associated with the identifier based on the count of packets and when the count is associated with a packet of instructions corresponding to the first set having the first priority level for the event; and
not trigger the event associated with the identifier based on the count of packets and when the count is associated with a packet of instructions corresponding to the second set having the second priority level for the event.

2. The integrated circuit device of claim 1, wherein:
the event test circuit is configured to couple to a processor core;
the processor core is configured to execute the packets of instructions; and
the event test circuit is configured to adjust the count stored in the test counter register based on the execution of each of the packets of instructions by the processor core.

3. The integrated circuit device of claim 2, wherein the event test circuit is configured to adjust the count stored in the test counter register independent of an amount of time used to execute the packets of instructions by the processor core.

4. The integrated circuit device of claim 2, wherein each of the packets of instructions includes a respective set of instructions to be executed in parallel by the processor core.

5. The integrated circuit device of claim 2 further comprising the processor core.

6. The integrated circuit device of claim 1, wherein:
the event test circuit includes a counter threshold register configured to store a threshold; and
the event test circuit is configured to trigger the event based on the count being equal to the threshold and the packet of instructions corresponding to the count is part of the first set having the first priority level for the event indicated by the second register.

7. The integrated circuit device of claim 1, wherein the event includes at least one of: an exception or an interrupt.

8. The integrated circuit device of claim 1, wherein:
the first set of one or more packets of instructions includes a first plurality of consecutive packets of instructions;
the second set of one or more packets of instructions includes a second plurality of consecutive packets of instructions; and
wherein the first and second pluralities of packets of instructions are part of a test loop for the software code and the second plurality of packets of instructions occur sequentially after the first plurality of packets of instructions in the test loop.

9. The integrated circuit device of claim 1, wherein:

the packets of instructions are executed as part of a test loop for the software code;

the event is one of a first event type or a second event type; and the first register is configured to store a first value corresponding to the first event type as the identifier for a first packet of instructions and to store a second value corresponding to a second event type for at least a second packet of instructions.

10. The integrated circuit device of claim 9, wherein:

the first packet of instructions is part of one of the first set or the second set of one or more packets of instructions; and the second packet of instructions is part of the other one of the first set or the second set of one or more packets of instructions.

11. An integrated circuit device that includes:

a processor core configured to execute a program that includes a set of instructions associated with software code being tested on the integrated circuit device, wherein the software code has a first priority level and the set of instructions is arranged into a set of at least a first set of packets and a second set of packets; and an event test circuit coupled to the processor core that includes:

a test counter register configured to store a count of packets;

a first register configured to store an identifier of an event; and a second register configured to store a second priority level of the event for the first set of packets and to store a third priority level of the event for the second set of packets, wherein the first priority level is lower than the second priority level but higher than the third priority level;

wherein the event test circuit is configured to:

adjust the count of packets based on execution of a packet of the set of packets; and based on the count of packets and the priority of the event, determine whether to trigger the event, wherein the event is triggered when the count of the packets corresponds to a packet of the first set of packets for which the second register stores the second priority level and is not triggered when the count of packets corresponds to a packet of the second set of packets for which the second register stores the third priority level.

12. The integrated circuit device of claim 11, wherein the event test circuit is configured to adjust the count of packets independent of an amount of time used to execute an instruction of the set of instructions by the processor core.

13. The integrated circuit device of claim 11, wherein each packet of the set of packets includes a respective subset of the set of instructions to be executed in parallel by the processor core.

14. The integrated circuit device of claim 11, wherein:

the event test circuit includes a counter threshold register configured to store a threshold; and the event test circuit is configured to trigger the event based on the count being equal to the threshold and the packet corresponding to the count being associated with the second priority level for the event indicated by the second register.

15. The integrated circuit device of claim 11, wherein the event includes at least one of: an exception or an interrupt.

16. A method comprising:

for a plurality of instruction packets each having a first priority level and corresponding to software code being tested using a processor core, associating a second priority level for an event with a first set of the instruction packets and associating a third priority level for the event with a second set of the instruction packets, wherein the first priority level is lower than the second priority level and the first priority level is higher than the third priority level;

executing an instruction packet by a processor core;

based on the executing of the instruction packet, adjusting a test count of instruction packets;

performing an event based on the test count of instruction packets and on whether the instruction packet associated with the test count is part of the first set of instructions packets associated with the second priority level; and not performing the event based on the test count of the instruction packets and on whether the instruction packet associated with the test count is part of the second set of instruction packets associated with the third priority level.

17. The method of claim 16, wherein the adjusting of the test count of packets is independent of an amount of time used to execute the instruction packet by the processor core.

18. The method of claim 16, wherein the event includes at least one of: an exception or an interrupt.

\* \* \* \* \*